US010956999B2

(12) United States Patent
Boss et al.

(10) Patent No.: US 10,956,999 B2
(45) Date of Patent: Mar. 23, 2021

(54) SERVICE CLASS PRIORITIZATION WITHIN A CONTROLLABLE TRANSIT SYSTEM

(71) Applicant: International Business Machines Corporation, Armonk, NY (US)

(72) Inventors: Gregory J. Boss, Saginaw, MI (US); Christopher J. Dawson, Arlington, VA (US); Rick A. Hamilton, II, Charlottesville, VA (US); Benjamin G. Morris, Falls Church, VA (US)

(73) Assignee: International Business Machines Corporation, Armonk, NY (US)

(*) Notice: Subject to any disclaimer, the term of this patent is extended or adjusted under 35 U.S.C. 154(b) by 492 days.

(21) Appl. No.: 15/415,115

(22) Filed: Jan. 25, 2017

(65) Prior Publication Data

US 2017/0132737 A1 May 11, 2017

Related U.S. Application Data

(63) Continuation-in-part of application No. 12/715,435, filed on Mar. 2, 2010, now abandoned.

(51) Int. Cl.
*G06Q 50/26* (2012.01)
*G06Q 10/06* (2012.01)
(Continued)

(52) U.S. Cl.
CPC ......... *G06Q 50/26* (2013.01); *G01C 21/3415* (2013.01); *G01C 21/3484* (2013.01);
(Continued)

(58) Field of Classification Search
CPC ... G06Q 10/06; G06Q 10/047; G01C 21/3415
See application file for complete search history.

(56) References Cited

U.S. PATENT DOCUMENTS 3,853,068 A 12/1974 Avery
4,061,089 A 12/1977 Sawyer
(Continued)

OTHER PUBLICATIONS

"Transit Network Optimization Minimizing Transfers and Maximizing Service Coverage with an Integrated Simulated Annealing and Tabu Search Method", by Fang Zhao, Ike Ubaka, and Albert Gan, Transportation Research Board of the National Academies, Washington, D.C., 2005, pp. 180-188, (Year: 2005).*
(Continued)

*Primary Examiner* — Pan G Choy
(74) *Attorney, Agent, or Firm* — William H. Hartwell; Maxine L. Barasch; Keohane & D'Alessandro, PLLC (57) ABSTRACT

An embodiment of the invention provides for multiple service classes within a controllable transit system (e.g., a PRT system), by route allocation according to service class priority. Routes are optimized for vehicles needing or entitled to the highest service level, then remaining capacity is used to optimize routes for the next lower service class. Such optimization can be extended indefinitely, through "N" service classes of service. In addition, an embodiment of the invention allows the cataloging of PRT capacity and vehicle types/roles/emissions, as well as related business models. The system provided hereunder provides a means of ensuring that various service classes of system users can be given treatment according to the service class in which they reside. Such prioritization leads to a more flexible system, with higher user satisfaction and a greater number of available business models (e.g., "pay for service class") permissible within the transit system.

6 Claims, 3 Drawing Sheets

(51) Int. Cl.
   *G06Q 10/02*    (2012.01)
   *G06Q 30/02*    (2012.01)
   *G05D 1/00*     (2006.01)
   *G01C 21/34*    (2006.01)
   *G08G 1/00*     (2006.01)
   *G06Q 10/04*    (2012.01)

(52) U.S. Cl.
   CPC ....... *G01C 21/3492* (2013.01); *G05D 1/0088* (2013.01); *G06Q 10/02* (2013.01); *G06Q 10/047* (2013.01); *G06Q 10/06315* (2013.01); *G06Q 10/06316* (2013.01); *G06Q 30/0235* (2013.01); *G08G 1/20* (2013.01)

(56) References Cited

U.S. PATENT DOCUMENTS

| | | | |
|---|---|---|---|
| 4,841,871 | A | 6/1989 | Leibowitz |
| 5,557,522 | A | 9/1996 | Nakayama et al. |
| 5,644,721 | A * | 7/1997 | Chung ............... G06Q 10/02 705/5 |
| 5,797,330 | A * | 8/1998 | Li ..................... B61B 13/06 104/119 |
| 5,799,263 | A | 8/1998 | Culbertson |
| 6,029,104 | A | 2/2000 | Kim |
| 6,262,976 | B1 | 7/2001 | McNamara |
| 6,263,799 | B1 | 7/2001 | Pardes |
| 6,318,274 | B1 | 11/2001 | Park |
| 6,621,420 | B1 | 9/2003 | Poursartip |
| 6,668,729 | B1 | 12/2003 | Richards |
| 6,711,548 | B1 * | 3/2004 | Rosenblatt ............ G06Q 10/02 705/5 |
| 6,810,817 | B1 | 11/2004 | James |
| 6,885,935 | B2 | 4/2005 | MacPhail et al. |
| 7,047,888 | B2 | 5/2006 | Richards |
| 7,391,341 | B2 | 6/2008 | Keaveny et al. |
| 7,454,457 | B1 * | 11/2008 | Lowery ............... H04L 43/0852 709/203 |
| 7,624,024 | B2 * | 11/2009 | Levis .................. G06Q 10/08 705/1.1 |
| 7,747,493 | B1 | 6/2010 | Monroe |
| 7,835,859 | B2 | 11/2010 | Bill |
| 7,908,080 | B2 * | 3/2011 | Rowley ............ G08G 1/096844 701/423 |
| 7,961,084 | B2 | 6/2011 | Aso et al. |
| 8,720,345 | B1 | 5/2014 | English |
| 2003/0233278 | A1 * | 12/2003 | Marshall ............ G06Q 30/0212 705/14.35 |
| 2004/0054549 | A1 * | 3/2004 | Chittenden ............ G01C 21/20 705/338 |
| 2006/0089787 | A1 | 4/2006 | Burr et al. |
| 2007/0288307 | A1 | 12/2007 | Mathews et al. |
| 2008/0027772 | A1 | 1/2008 | Gernega et al. |
| 2008/0165032 | A1 | 7/2008 | Lee et al. |
| 2008/0262716 | A1 * | 10/2008 | Li .................. G08G 1/096844 701/533 |
| 2009/0005963 | A1 * | 1/2009 | Jarvinen .......... G08G 1/096883 701/533 |
| 2009/0099715 | A1 | 4/2009 | Cho et al. |
| 2011/0218833 | A1 | 9/2011 | Boss et al. |
| 2011/0218835 | A1 | 9/2011 | Boss et al. |

OTHER PUBLICATIONS

"Prioritized Traffic Restoration in Connection Oriented QoS based Networks", by Bjorn Jager and David Tipper, Department of Information Science and Telecommunications, University of Pittsburgh, Pittsburg, PA 15260, USA, May 2003. (Year: 2003).*

"Optimal Transit Route Network Design Problem with Variable Transit Demand: Genetic Algorithm Approach", by Wei Fan and Randy B. Machemehl, Journal of Transportation Engineering, ASCE, Jan. 2006. (Year: 2006).*

Loftis, Johnna Ronee, Application No. 12/715,457, Final Office Action dated Mar. 15, 2019, 8 pgs.

Loftis, Johnna Ronee, U.S. Appl. No. 12/715,457, Office Action dated Nov. 2, 2018, 13 pgs.

Zhao et al., "Operational Level-of-Service Index Model for Rail Rapid Transit", TRB Transportation of Research Board Conference Proceedings, vol. 2, Issue No. 8, Publication Date 1997, 2 pages.

Fang Zhao, "Large-Scale Transit Network Optimization by Minimizing User Cost and Transfers", Journal of Public Transportation, vol. 9, No. 2, 2006, pp. 107-129.

Zhao et al., "Transit Network Optimization", Transportation Research Record: Journal of the Transportation Research Board, No. 1923, Transportation Research Board of the National Academies, Washington, D.C., 2005, 1 page.

Prof. Alain L. Kornhauser, Personal Rapid Transit (PRT) for New Jersey, Princeton University, Orf 467 Transportation Systems Analysis, Fall 2005, 118 pages.

Wei Fan et al., "Optimal Transit Route Network Design Problem with Variable Transit Demand: Genetic Algorithm Approach", Journal of Transportation Engineering, Copyright ASCE, Jan. 2006, pp. 40-51.

Boontariga Kasemsontitum, "Vehicle Routing With Time Windows and Driver Learning", Faculty of the Graduate School, University of Southern California, May 2006, 172 pages.

Mohamed Medhat Amin Abdel Latif Wahba, "MILATRAS MIcrosimulation Learing-based Approach to TRansit ASsignment", Graduate Department of Civil Engineering, University of Toronto, Copyright by Mohamed Wahba, 2008, 293 pages.

Mao-Chang Shih, "A design methodology for bus transit route networks with coordinated operations", University of Texas at Austin, 1994, 260 pages.

Pang G. Choy, USPTO Office Action, U.S. U.S. Appl. No. 12/715,435, dated Mar. 27, 2012, 20 pages.

Pang G. Choy, USPTO Final Office Action, U.S. U.S. Appl. No. 12/715,435, dated Oct. 22, 2012, 25 pages.

Pang G. Choy, USPTO Office Action, U.S. Appl. No. 12/715,435, Notification Date Oct. 10, 2014, 40 pages.

Pang G. Choy, USPTO Final Office Action, U.S. Appl. No. 12/715,435, Notification Date Apr. 3, 2015, 35 pages.

Pang G. Choy, USPTO Office Action, U.S. Appl. No. 12/715,435, Notification Date Jan. 14, 2016, 15 pages.

Pang G. Choy, USPTO Final Office Action, U.S. Appl. No. 12/715,435, Notification Date Aug. 4, 2016, 20 pages.

Brandi P. Parker, USPTO Office Action, U.S. Appl. No. 12/715,457, dated Nov. 15, 2011, 14 pages.

Johnna Ronee Loftis, USPTO Office Action, U.S. Appl. No. 12/715,457, Notification Date Feb. 4, 2013, 14 pages.

Johnna Ronee Loftis, USPTO Final Office Action, U.S. Appl. No. 12/715,457, Notification Date Jun. 4, 2013, 11 pages.

Johnna Ronee Loftis, USPTO Office Action, U.S. Appl. No. 12/715,457, Notification Date Mar. 27, 2014, 11 pages.

Johnna Ronee Loftis, USPTO Office Action, U.S. Appl. No. 12/715,457, Notification Date Sep. 10, 2014, 16 pages.

Johnna Ronee Loftis, USPTO Final Office Action, U.S. Appl. No. 12/715,457, Notification Date Mar. 26, 2015, 6 pages.

Johnna Ronee Loftis, USPTO Examiners Answer, U.S. Appl. No. 12/715,457, Notification Date Feb. 12, 2016, 7 pages.

Loftis, Johnna Ronee, U.S. Appl. No. 12/715,457, Office Action dated Jul. 11, 2019, 13 pgs.

Loftis, Johnna Ronee, USPTO Final Office Action, U.S. Appl. No. 12/715,457, Notification Date Oct. 28, 2019, 6 pages.

* cited by examiner

SERVICE CLASS PRIORITIZATION WITHIN A CONTROLLABLE TRANSIT SYSTEM

RELATED U.S. APPLICATION DATA

This patent document is a continuation-in-part, and claims the benefit of, co-pending and co-owned U.S. patent application Ser. No. 12/715,435, filed Mar. 2, 2010, which is related in some aspects to co-pending and co-owned U.S. patent application Ser. No. 12/715,457, filed Mar. 2, 2010, the entire contents of which is incorporated herein by reference.

TECHNICAL FIELD

The present invention generally relates to transit systems (e.g., Personal Rapid Transit (PRT) systems). Specifically, the present invention relates to service class prioritization within a controllable transit system.

BACKGROUND

As energy conservation becomes an increasingly important goal, one area of possible improvement is traffic and/or transportation management. Today, a traveler's options are typically limited to either an individual mode of transportation (e.g., an automobile), or mass transit (e.g., airplanes, subways, buses, trains, etc.). Neither option is entirely efficient. As a result, the more recent concept of "Personal Rapid Transit" (PRT) has emerged. PRT is a public transportation concept that offers on-demand, non-stop transportation using small, automated vehicles on a network of specially-built guide-ways. However, several issues stand in the way of efficient management of PRT systems.

SUMMARY

In general, an embodiment of the invention provides for multiple service classes within a controllable transit system (e.g., a PRT system), by route allocation according to service class priority. Routes are optimized for vehicles needing or entitled to the highest service level, then remaining capacity is used to optimize routes for the next lower service class. Such optimization can be extended indefinitely through "N" service classes of service. In addition, an embodiment of the invention allows the cataloging of PRT capacity and vehicle types/roles/emissions, as well as related business models. The system provided hereunder provides a means of ensuring that various service classes of system users can be given treatment according to the service class in which they reside. Such prioritization leads to a more flexible system, with higher user satisfaction and a greater number of available business models (e.g., "pay for service class") permissible within the transit system.

A first aspect of the present invention provides a method for prioritizing service classes within a controllable transit system, comprising: determining a service class of a vehicle within the controllable transit system based on a set of attributes of the vehicle; determining, based on the service class, a route for the vehicle to follow to reach a desired destination; determining whether a capacity of the route can accommodate the vehicle; and reserving the route for the vehicle if the capacity can accommodate the vehicle.

A second aspect of the present invention provides a system for prioritizing service classes within a controllable transit system, comprising: a memory medium comprising instructions; a bus coupled to the memory medium; a processor coupled to the bus, that when executing the instructions causes the system to: determine a service class of a vehicle within the controllable transit system based on a set of attributes of the vehicle; determine, based on the service class, a route for the vehicle to follow to reach a desired destination; determine whether a capacity of the route can accommodate the vehicle; and reserve the route for the vehicle if the capacity can accommodate the vehicle.

A third aspect of the present invention provides a computer readable medium containing a program product for prioritizing service classes within a controllable transit system, the computer readable medium comprising program code for causing a computer to: determine a service class of a vehicle within the controllable transit system based on a set of attributes of the vehicle; determine, based on the service class, a route for the vehicle to follow to reach a desired destination; determine whether a capacity of the route can accommodate the vehicle; and reserve the route for the vehicle if the capacity can accommodate the vehicle.

A fourth aspect of the present invention provides a method for deploying a system for prioritizing service classes within a controllable transit system, comprising: providing a computer infrastructure being operable to: determine a service class of a vehicle within the controllable transit system based on a set of attributes of the vehicle; determine, based on the service class, a route for the vehicle to follow to reach a desired destination; determine whether a capacity of the route can accommodate the vehicle; and reserve the route for the vehicle if the capacity can accommodate the vehicle.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. General Description
II. Computerized Implementation

I. General Description

As indicated above, an embodiment of the invention provides for multiple service classes within a controllable transit system (e.g., a PRT system), by route allocation according to service class priority. Routes are optimized for vehicles needing or entitled to the highest service level, then remaining capacity is used to optimize routes for the next lower service class. Such optimization can be extended indefinitely, through "N" service classes of service. In addition, an embodiment of the invention allows the cataloging of PRT capacity and vehicle types/roles/emissions, as well as related business models. The system provided hereunder provides a means of ensuring that various service classes of system users can be given treatment according to the service class in which they reside. Such prioritization leads to a more flexible system, with higher user satisfaction and a greater number of available business models (e.g., "pay for service class") permissible within the transit system.

Within this invention, service classes of vehicles (e.g., vehicles) are defined and characterized by a precedence or priority order. Service classes are based on service classification characteristics/attributes such as (but not limited to) Vehicle Type, User Type, User Role, and Vehicle Emissions. Within any temporal routing window, a relative high service class of users can be routed, and then a lower service class of user is routed using any remaining capacity. The system uses a methodology to determine capacity, which includes data regarding the transit system. This data includes elements such as (but not limited to) number of PRT lanes or width, PRT speeds (restrictions, min., max., etc.), construction, real-time traffic flow monitoring, congestion, historical data, and anticipated conditions. Such PRT system capacity is thus "harvested" from the remaining balance of system capacity. This operation is repeated until all user service classes have been routed accordingly. It should be understood that although illustrative embodiments of the invention as described herein pertain to a PRT system, this need not be the case. Rather, the teachings recited herein could be implemented in conjunction with any type of controllable transit/transport system now known or later developed.

In general, PRT is a public transportation concept that offers on-demand, non-stop transportation using small, automated vehicles on a network of specially-built guide-ways. Unfortunately, several issues stand in the way of efficient management of PRT systems. From an engineering standpoint, they can be envisioned as very small subway cars, sometimes as small as three seats. Unlike other forms of mass transit, PRT systems do not stop at every station, using "offline" stations to bypass vehicles that are stopped along the route. Since the guide-ways are arranged in a network, like roads, PRTs can travel along shortest-path routes, like a car. Yet, unlike roads, these routes are on a separate right-of-way, and the offline stations prevent traffic congestion. This allows PRTs to offer lower trip times than any other form of urban transit. The personalized point-to-point service operates more like a taxi than a subway.

Shown below are two examples of these concepts:

Example 1

A PRT system may have multiple service classes, (e.g., service class A conforming to passenger vehicles, service class B conforming to normal delivery vehicles, and service class C conforming to garbage and waste vehicles). In this case, the passenger vehicles first receive prioritization for optimal routes. Once these routes are created for any interval of time, resultant congestion and road/track usage information is used to optimize routes for delivery vehicles. Once these routes are created for any interval of time, resultant congestion and road/track usage information is used to optimize routes for waste management vehicles.

Example 2

A PRT system has a dynamic service classification system wherein a unit containing two tourists is traveling within an area designated as a commercial area which benefits significantly from tourism. Another PRT unit contains one citizen who lives within the PRT area. Currently, both units are within the designated area for tourism, so in this case the tourists' PRT unit might be given a service class A designation, whereas the unit containing the local citizen is given a service class B designation. At a future point in time, both units travel beyond the commercial areas designated for tourism and, at that point in time, the system service classifies the citizens' unit as service class A (service class upgrade) and service classifies the tourists' unit as service class B (service class downgrade). The PRT system updates the optimized routing for each vehicle based on the available capacity of the system.

Service Classes

Service Classes are defined by a set (e.g., at least one) of attributes that are purposefully flexible in order to accommodate different types of PRT systems. An ideal implementation might include one or more of the following attributes:

Vehicle Type: passenger, delivery, sanitation, emergency

User Type: single commuter, car pool, personal, business

User Role: fire, police, government, doctor, citizen, visitor, tourist, etc.

Vehicle emissions, if applicable: (high, medium, low)

Vehicle Characteristic if applicable: electric, hybrid, gas, diesel

While it is recognized that most currently planned PRT systems may be electrified, emissions and drive train characteristics are included here for the sake of completeness and to ensure applicability to the widest possible range of future design points. In any event, in a typical embodiment, service classes are prioritized. This allows the routing service to determine optimal routes first to higher service classes and secondarily to lower service classes. Service class priorities would typically be denoted by a numerical or other prioritizing value.

Dynamically Fluctuating Service Classes

Service classes do not need to be static in nature, but may be dynamic and based on various conditions. This allows for a more flexible PRT system that can adjust to business and ambient/environmental conditions. Service classes could, for instance, change priorities based on the following conditions (i.e., when such a condition is met, the service class of a specific PRT unit may be dynamically changed to another service class (either higher or lower).

Fluctuating Service Class based on Location

Here, a PRT system can define various boundaries within a region that define a desired attribute, and a vehicle can upgrade or downgrade service classes when they enter and exit these geographical boundaries. Embedded or external (e.g., GPS system or similar tracking methods) systems could be employed to determine when a vehicle enters or exits a defined boundary.

Example 1

A municipality that defines an area of the city that benefits greatly from tourism. A service class PRT with a User Role of type "Tourist" would then be upgraded to the highest service class while within those boundaries and downgraded to a lower service class when leaving those boundaries.

Example 2

A commuter might be upgraded to a higher service class while on his/her way to work, but downgraded when deviating from the established route to work.

Fluctuating Service Class Based on Time

Here a PRT system can define various time-bounded properties that are able to trigger an upgrade or downgrade to an existing service class.

Example 3

Delivery vehicles might have certain hours (e.g., 4:00-6:00 a.m. and 1:00-3:00 p.m.) when they are upgraded to have right-of-way. During other times, they take on a lower service class than other users.

Example 4

Maintenance work/vehicles could be assigned a lower or higher priority service class according to time of day, or day of week.

Example 5

Service class incentives could be offered for those reserving their trip in advance, and are punctual (e.g., appear at your reservation time and are not late). This could allow for more advanced planning on the part of the overall network management.

Fluctuating Service Class Based on Changed Service Class Attributes or External Factors Any other attribute within the Service class or external factors can be used as a mechanism to trigger a service class change.

Example 6

Service class may be driven by external factors, e.g., seniors get reservation priority on extra hot days.

Example 7

Special events may get 90% of the capacity for short bursts of time, based upon planning for such events.

Example 8

School schedules may result in windows of time where those customers get some level of priority.

Example 9

Lower service class riders may be scheduled so as to increase system efficiency and thus receive a higher service class upon subsequent transport (e.g., people may be commuting from various downtown locations to a park & ride garage. It makes sense to bring them to collection points within a zone, have them disembark from a smaller vehicle, then get into larger, shared vehicles for a streamlined high-priority "shuttle" trip to the garage).

Determining Harvestable Capacity

Harvestable capacity is determined by evaluating data such as:
1. the number of PRT lanes or width;
2. PRT speeds (restrictions, min., max., etc.);
3. construction;
4. real time traffic flow monitoring;
5. congestion;
6. historical data;
7. anticipated conditions (known events such as a sports event, planned maintenance, etc.); and
8. real time physical system conditions (track/road sensors, vehicle breakdowns, etc.).

Once the above items are collected, an evaluation of how much additional traffic a particular route can handle is determined. Once the number of additional vehicles that can efficiently use that route are determined, the system then continues to optimize routes starting with the highest remaining un-optimized PRT unit and continues onward until a route is full. Once a route is full, an alternate "next best" route is determined and un-optimized PRT units are given optimized routes and so on until no more optimization is available—determined by no more harvestable capacity.

Steps to Perform a harvested capacity optimization:
1. Identification Steps
   1. PRT user logs into a system.
   2. System retrieves Users profile which contains things like the user's role and other attributes.
   3. Alternatively, an anonymous system can be used (special use PRT units, for example, that only perform one type of function (i.e., tourism functions for example)
2. PRT unit (or user of a PRT system) enters a desired destination
3. PRT unit communicates destination, current location, user, and attributes to Harvest Routing System (HRS).
4. HRS determines PRT units current service class of service.
5. HRS evaluates best route (shortest distance, shortest time, most scenic, etc).
6. HRS determines if there is capacity on the best route.
   1. If yes, then reserve route.
      a. Return route to PRT Unit for execution.
      b. HRS controls the PRT vehicle, causing the PRT vehicle to traverse the reserved route at the reserved time.
   2. If no, then determine next best route and go to step 6.

Figure 1:
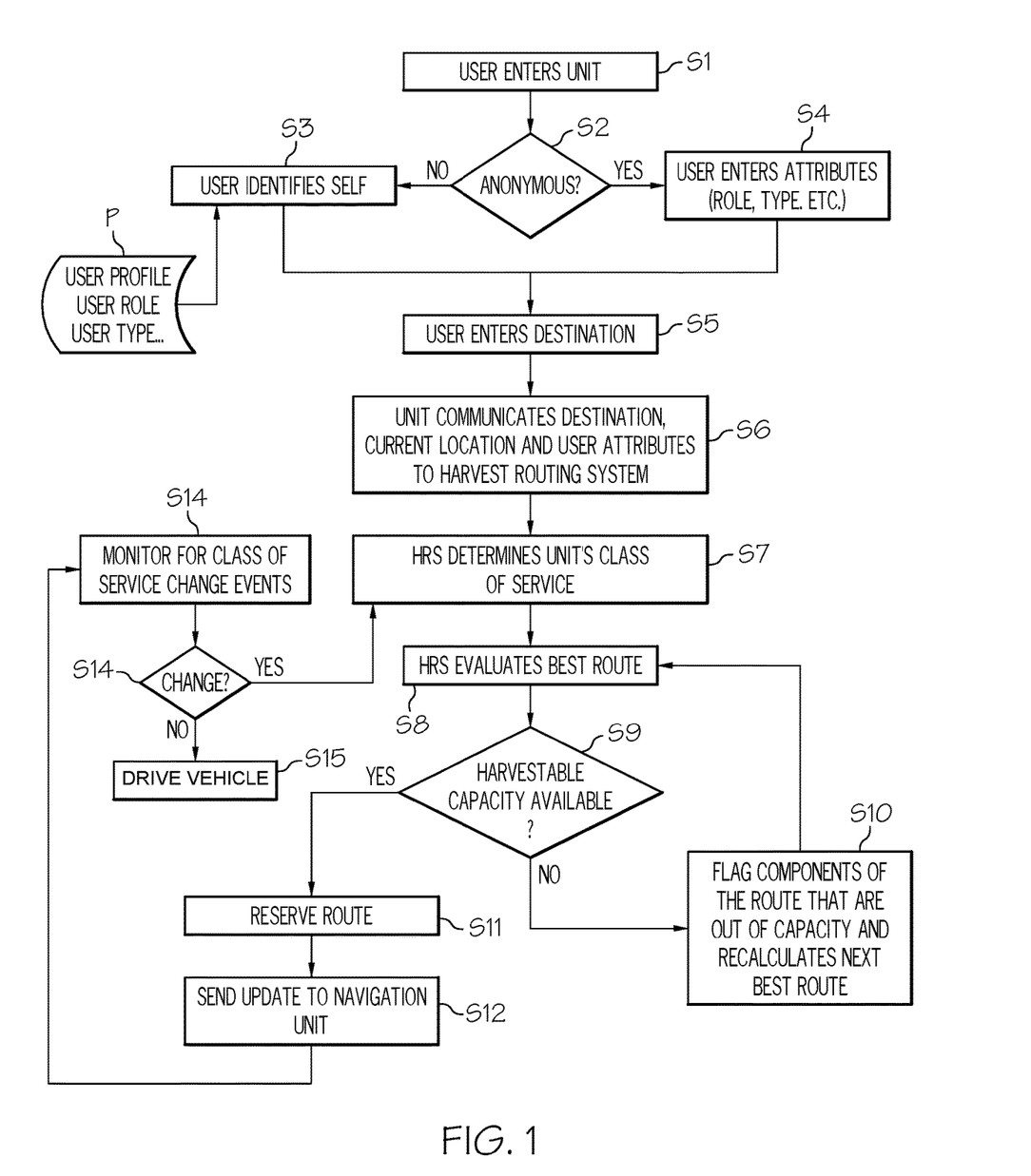
FIG. 1 shows a method flow diagram according to an embodiment of the present invention.
Figure 2:
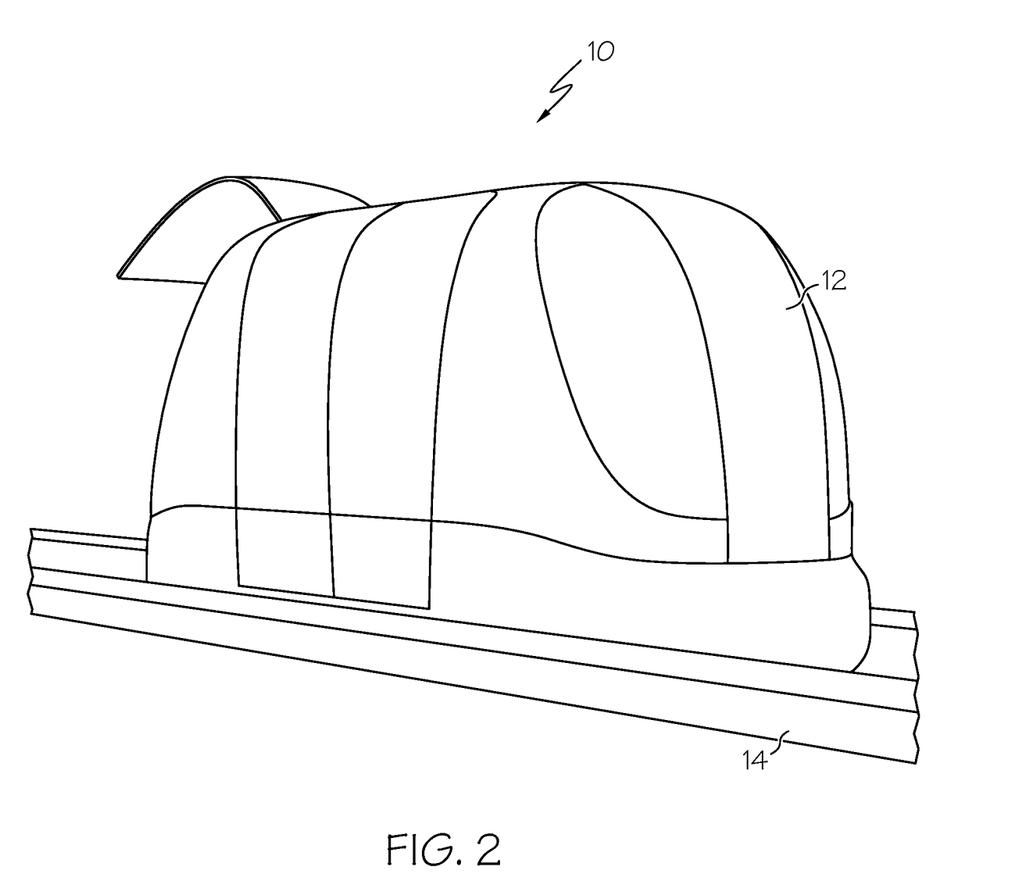
FIG. 2 shows an illustrative vehicle within a controllable transit system according to the present invention.

The concepts set forth above will now be further described in conjunction with the flow diagram of FIG. 1 and the illustrative controllable transit system 10 of FIG. 2. In step S1, the user enters the vehicle/unit, which is shown mounted on a rail system 14. In step S2, it is determined whether the user wishes to remain anonymous. If not, the user identifies his/herself in step S3, which results in his/her corresponding profile P being retrieved. The profile can include, among other things, the user's role, his/her type, any restrictions or travel criteria he/she may have. However, if the user wished to remain anonymous, he/she can manually enter pertinent information in step S4. The user will then enter a desired destination in step S5. In step S6, the vehicle 12 communicates the desired destination, a current location, and user attributes/criteria (e.g., a desired time of transit). Based on this information, a service class of service is determined in step S7. As mentioned above, the service class of service can be based on any number of attributes such as what type of vehicle 12 it is (e.g., an emergency vehicle), who is in the vehicle (e.g., the Chief of Police), etc. In any event, based on the service class of service, a route is determined in step S8. In general, the route is determined to get the user to their desired destination within any time constraints, which take into account outside factors such as traffic congestion, etc. In step S9, it is determined whether the planned route actually has the capacity to accommodate the vehicle 12 (e.g., also referred to as harvested capacity). If so, the route is reserved in step S11, and the system is updated in step S12. If the capacity was lacking, the parts of the route that are out of capacity are "flagged" and an alternate route is determined in step S10. Regardless, once the route is reserved in step S11 and updates are sent in step S12, the system monitors for service class changes in step S13. Such changes can occur when any of the attributes that were originally used to determine the service class change. For example, the user's service class could change, an emergency could arise, etc. At step S14, it is determined whether a change was detected. If so, the process flows to S7. If no, the process proceeds to step S15, where the vehicle is controlled to traverse the reserved route within time constraints of the reservation. In some embodiments, the vehicle is a PRT vehicle adapted to traverse a network of guideways. In some embodiments, the vehicle is an automated self-driving car routed and controlled to traverse, by driving along, a set of (at least one) tracks or roads. It should be understood that the above steps is only one way of carrying out the present invention. For example, the following concepts could also be provided hereunder: (1) a composite service class of multiple customers in a single vehicle (e.g. 3 lower service class riders in one vehicle get priority over one higher service class single passenger); and (2) a composite service class for routing priority made up of multiple vehicle service classes for a platoon of vehicles travelling a largely identical route.

II. Computerized Implementation

Figure 3:
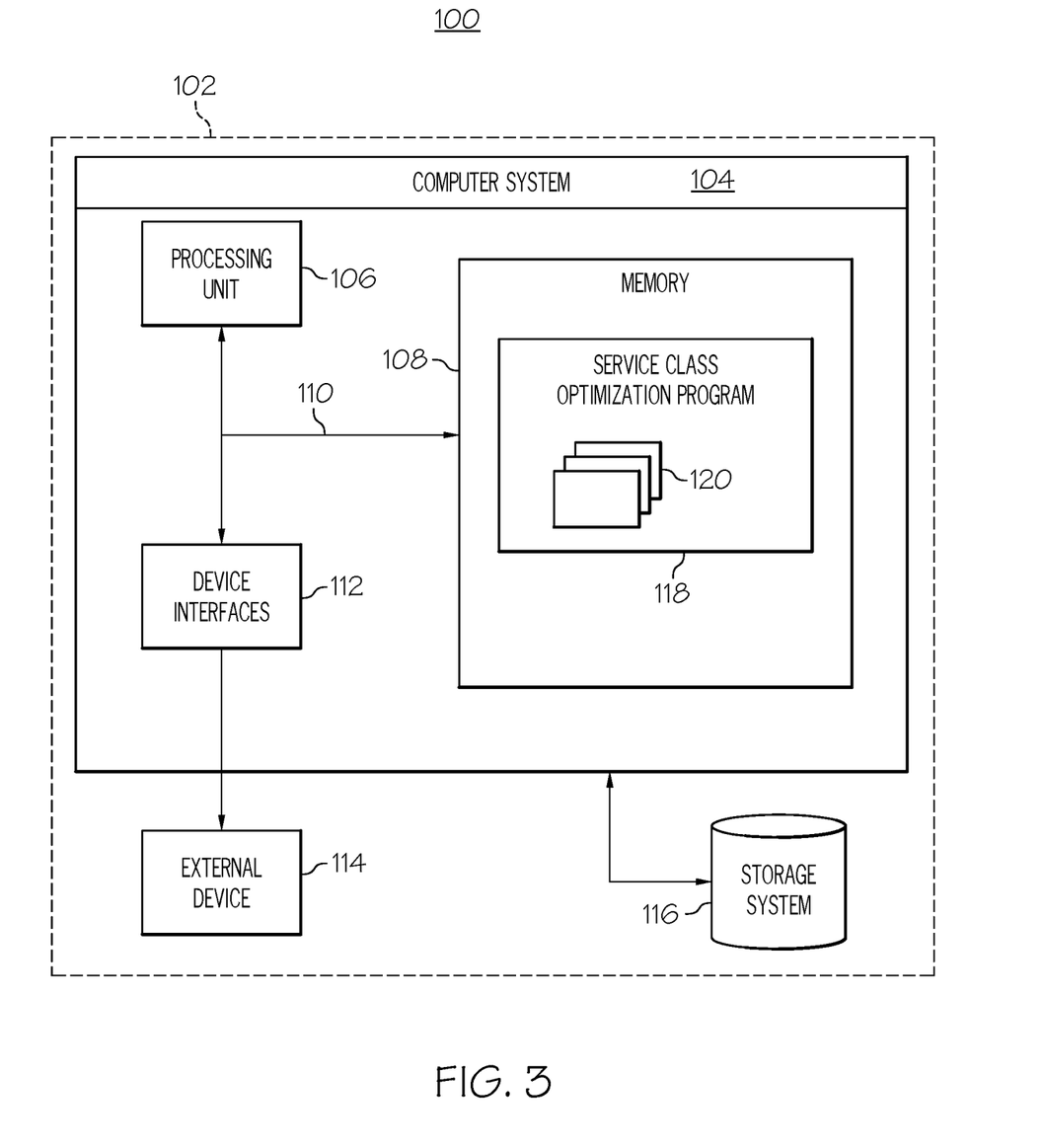
FIG. 3 shows a more specific computerized implementation according to an embodiment of the present invention.

Referring now to FIG. 3, a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and a device interfaces 112. Further, computer system 104 is shown having external devices 114 and storage system 116 that communicate with bus 110 via device interfaces 112. In general, processing unit 106 executes computer program code, such as route optimization software/program 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a keyboard, a pointing device, a display, etc.; one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104. Shown in memory 108 of computer system 104 is route optimization program 118, with a set of modules 120. The modules 120 generally provide the functions of the present invention as described herein. Specifically (among other things), set of modules 120 is configured to: determine a service class of a vehicle within the controllable transit system based on a set of attributes of the vehicle; determine, based on the service class, a route for the vehicle to follow to reach a desired destination; determine whether a capacity of the route can accommodate the vehicle; reserve the route for the vehicle if the capacity can accommodate the vehicle; determine an alternate route if the capacity cannot accommodate the vehicle; and/or dynamically change the service class in response to a change of the set of attributes.

While shown and described herein as a service class prioritization solution, it is understood that the invention further provides various alternative embodiments. For example, in one embodiment, the invention provides a computer-readable/useable medium that includes computer program code to enable a computer infrastructure to provide a service class prioritization solution. To this extent, the computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide a service class prioritization solution. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising.

In still another embodiment, the invention provides a computer-implemented method for service class prioritization within a controllable transit system such as a PRT. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 3), from a computer-readable medium; adding one or more computing devices to the computer infrastructure; and incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A transit system, comprising:
a network of guideways specifically built for a personal rapid transit (PRT) system;
a harvest routing system (HRS) comprising a routing server that controls a plurality of PRT vehicles based on GPS instructions;
the plurality of PRT vehicles that operate on the network of guideways, each PRT vehicle of the plurality of PRT vehicles having a navigation unit in communication with the HRS, and being a small automatically controlled form of ground-based public transportation that provides on-demand, non-stop, point-to-point transportation to an individual traveler, wherein the navigation unit receives the GPS instructions over a wireless network; and
the routing server having a memory medium comprising executable instructions, a bus coupled to the memory medium, and a processor coupled to the bus, that when executing the executable instructions causes the processor to:
   determine a service class of a PRT vehicle of the plurality of PRT vehicles, within the transit system based on a set of attributes of the PRT vehicle, the service class comprising a priority relative to other service classes;
   compute an initial route for each PRT vehicle of the plurality of PRT vehicles along the network of guideways of the PRT system, the initial route being based on a priority level of the PRT vehicle, the priority level being based on a service class of the PRT vehicle, wherein computing of the initial route includes:
      determining an amount of traffic a PRT route can handle;
      adding PRT vehicles to the PRT route starting with a remaining PRT vehicle having a highest priority until the PRT route is full;
      determining, in response to the PRT route being full, an alternate next best route; and
      assigning next best routes to remaining PRT vehicles in descending order of priority until no more harvestable capacity is available;
   fluctuate the priority of the service class based on change in a geographic location of the PRT vehicle from a first geographic region that has a first priority for a particular attribute at a prescribed time to a second geographic region that has a second priority for the particular attribute at the prescribed time;
   determine, based on the priority of the service class in response to the fluctuation of the priority of the service class, a route for the PRT vehicle to follow that is different from the initial route;
determine a capacity of the route based on traffic conditions;
determine whether the capacity of the route can accommodate the PRT vehicle;
reserve the route for the PRT vehicle in response to a determination that the capacity can accommodate the PRT vehicle;
in response to the determination that the capacity can accommodate the PRT vehicle, send the GPS instructions comprising the reserved route to the navigation unit associated with the PRT vehicle; and
control the PRT vehicle, by the HRS in communication with the navigation unit, traveling along the reserved route.

2. The system of claim 1, wherein the set of attributes comprises a type of a passenger of the PRT vehicle; and
wherein the type of the user comprises at least one of: single commuter, car pool, personal, or business.

3. The system of claim 1, wherein the set of attributes comprises a role of the passenger of the PRT vehicle; and
wherein the role of the user comprises at least one of: fire, police, government, doctor, citizen, visitor, or tourist.

4. The system of claim 2, wherein the set of attributes comprises a type of vehicle of the PRT vehicle; and
wherein types of vehicles in the controllable transit system include passenger, delivery, sanitation, emergency.

5. The system of claim 1, the system further being caused to dynamically change the service class in response to a change of the set of attributes.

6. The system of claim 1, the executable instructions further causing the processor to:
determine an alternate route for a second PRT vehicle in response to a determination that the capacity cannot accommodate the second PRT vehicle; and
automatically navigate the PRT vehicle along the alternative route in response to a determination that the capacity cannot accommodate the PRT vehicle.

* * * * *